United States Patent [19]

Shahbender

[11] 3,777,369

[45] Dec. 11, 1973

[54] METHOD OF MAKING A MAGNETIC RECORDING HEAD

[75] Inventor: Rabah A. Shahbender, Princeton, N.J.

[73] Assignee: RCA Corporation, New York, N.Y.

[22] Filed: Sept. 20, 1971

[21] Appl. No.: 182,104

Related U.S. Application Data

[62] Division of Ser. No. 685,491, Nov. 24, 1967, abandoned.

[52] U.S. Cl. ............... 29/603, 29/609, 179/100.2 C
[51] Int. Cl. ........................... G11b 5/42, H01f 7/06
[58] Field of Search ............................. 29/603, 609; 179/100.2; 340/174.1 F; 346/74 MC

[56] References Cited

UNITED STATES PATENTS

| | | | |
|---|---|---|---|
| 2,361,752 | 10/1944 | Eilenberger | 179/100.2 C |
| 3,542,971 | 11/1970 | Willard | 29/603 X |
| 3,271,718 | 9/1966 | Shaw | 29/609 X |
| 3,509,623 | 5/1970 | Murphy et al. | 29/603 |
| 3,521,295 | 7/1970 | Poole et al. | 29/603 X |
| 3,504,134 | 3/1970 | Miyata | 29/603 X |
| 2,674,659 | 4/1954 | Buhrendorf | 179/100.2 C |
| 2,835,743 | 5/1958 | Muffley | 179/100.2 C |

*Primary Examiner*—Richard J. Herbst
*Assistant Examiner*—Carl E. Hall
*Attorney*—Eugene M. Whitacre et al.

[57] ABSTRACT

There is disclosed a magnetic transducer and method of manufacturing the same. The transducer comprises a body of high reluctance material through which apertures are drilled for accepting the free ends of a loop of magnetically permeable material. The loop ends and the surface of the body through which they project are machined to form a smooth planar surface in which the loop ends are separated by the desired gap dimension.

3 Claims, 7 Drawing Figures

INVENTOR
Rabah A. Shahbender
BY Edward J. Norton
ATTORNEY

METHOD OF MAKING A MAGNETIC RECORDING HEAD

This is a division of application Ser. No. 685,491, filed Nov. 24, 1967 now abandoned.

BACKGROUND OF INVENTION

It is known that the gap dimension is an important consideration in the frequency response of a magnetic recording head. The high frequency response characteristic depends upon the relative speed of the tape or other record medium past the transducer head and the gap width of the head. Because there are practical limits on the relative speed of the medium past the transducer head which can be attained, the gap width of the head must be made quite small to provide adequate high frequency response.

Many recording heads employ some type of "U" shaped magnetically permeable core member whose ends comprise the pole pieces which are shaped to give the desired gap dimensions. Since the core with the pole pieces is a portion of the support structure of the head, the minimum size in which such heads may be fabricated must be limited in order to maintain structural rigidity. This limits the proximity of spacing of the transducers where a multiple head assembly is desired and reduces the number of recording tracks which may be accommodated on a given tape. With such a head structure, the pole pieces must absorb the major portion of the abrasive effect of the tape motion. This produces rapid wear of the pole pieces resulting in gap dimension changes which ultimately cause loss of high frequency response in the recording.

It is therefore an object of the present invention to provide an improved magnetic transducer capable of high frequency operation and prolonged life expectancy.

Another object of the invention is to provide an improved magnetic transducer which is small in size and therefore highly suitable for use in multiple recording head assemblies.

Still a further object is to provide a method for manufacturing an improved magnetic transducer which is small in size and has excellent wear resistant properties.

These and other objects are accomplished according to one embodiment of the present invention by utilizing a body of material having high reluctance and high wear resistance as the structural support member of the transducer. The body has two apertures of rectangular cross setion completely through it which terminate at one end in a planar surface of the body. The center lines of the apertures are oriented to be at equal but opposite angles to a normal of the planar surface which lies between them. The angle is chosen to produce a desired dimension along the planar surface between the apertures. A loop of magnetically permeable material is disposed adjacent to the body with its free ends filling the apertures, the tips of the loop being flush with the planar surface. An electric coil which encircles a portion of the loop provides a means for exciting magnetic flux in the loop. The rectangular cross sectional apertures of the body which are filled by the loop provide the desired pole piece dimensions of the transducer and support for the remainder of the magnetic loop. According to a feature of the invention the wear resistance properties of the body material is greater than the magnetic loop material. This feature in conjunction with the structure of the transducer disclosed herein enables the surface of the body material surrounding the pole pieces to absorb the major portion of the abrasive action of the tape motion. This results in substantial reduction of the rate of wear of the pole pieces thereby perpetuating the frequency response characteristics of the transducer and prolonging its useful life. Since the cross sectional area of the apertures containing the pole pieces and the distance between the apertures can be made quite small, a multiple recording head assembly may be constructed according to the principles of the present invention in which the transducers are in close proximity and precisely located with respect to one another.

Also according to the invention, a method of manufacturing such transducers is described in which apertures having a rectangular cross section are drilled through the body member. A length of wire having appropriate magnetic properties is formed into a loop. Each of the free ends of the loop is passed through a different one of the apertures so as to completely fill the apertures and thereby form the pole pieces of the transducer. The surface of the body including the loop ends are then machined to form an integral smooth planar surface having the desired dimension between the pole pieces along the planar surface. Flux excitation means is formed by successively passing a length of electrically conductive wire around the loop to form a coil which encircles a portion of the loop.

In a second method according to the invention, the magnetic loop member is formed from a laminated strip of oxidized magnetic material. This is accomplished by oxidizing the surfaces of a plurality of sheets of magnetic material which are then fused together, cut into narrow strips and bent into the desired loop shape.

BRIEF DESCRIPTION OF THE DRAWINGS

FIG. 4*a–b* are a sequence of perspective view illustrating the steps in a method of manufacturing a portion of a magnetic transducer according to the present invention.

If reference is made to FIG. 2, there is shown a magnetic transducer comprising a body member 1, a loop of magnetically permeable material 2 and an electrical excitation means 3. The body 1 is preferably constructed from a rigid or semi-rigid material having the properties of high reluctance, electrical nonconductance, and high wear resistance. A suitable material for such application is sapphire. The body 1 may be cut or formed to have any desired shape which includes at least one planar surface 15. Two apertures 4 and 5 each having identical rectangular cross sectional areas are drilled completely through the body 1 by means of a device such as an electron beam drilling machine. The cross sectional dimensions of the apertures 4 and 5 are chosen to coincide with the desired pole piece dimension of the transducer. The center lines 13 and 14 of the apertures 4 and 5, respectively, intersect at a point outside the body and form equal acute angles with the normal 12 of the planar surface 15. A strip of magnetically permeable material is bent into the shape of a loop 2. Each of the free ends of loop 2 is passed through one of the apertures 4 and 5 of the body 1 to form the magnetic flux path of the transducer. The cross sectional dimension of the material of the loop 2 is such that it completely fills the apertures 4 and 5. The free ends of loop 2 which protrude through the planar surface 15 are machined to form the pole pieces 16 and 17 which are flush with and an integral part of the planar surface 15. The planar surface 15 including the pole piece loop ends 16 and 17 are then lapped to provide a smooth surface with the desired gap dimension along the surface 15 between the pole pieces. Flux is excited in the magnetic loop 2 by means of an electric coil 3 which is formed, for example, by successively passing a length of electrically conductive wire about a portion of the loop 2. Means for supplying appropriate electrical potential to and from the coil 3 is known in the art and is therefore not shown. FIG. 3 is a bottom view of the transducer structure of FIG. 2. FIG. 1 is a top view of the transducer of FIG. 2.

The material from which the loop 2 of FIGS. 1, 2, and 3 is formed, preferably has high magnetic permeability and a reluctance which is small compared to the material of the body 1. A material such as appropriately treated permalloy is suitable for the loop 2 or a special alloy composed of 79 percent nickel, 17 percent iron, 3 percent niobium and 1 percent silver described by D. H. Smith in Intermag Paper No. 4.3, 1965 Proceedings of the Intermag Conference may be used. Alternatively, in order to eliminate eddy current damping in the loop 2 and realize high frequency recording with the transducer, the magnetic material of the loop 2 has a laminated structure. Referring to FIG. 4*a–b*, one method of manufacturing a loop 2 of laminated material is shown. A thin sheet of permalloy or other suitable magnetic material is cut into pieces 25, 26, 27, for example, 1 inch by 2 inches. The edges 29 and 31 of sheet 25 and their corresponding opposite edges which are not visible in FIG. 4*a* are appropriately masked. The sheet 25 is then heated in a proper oxidizing atmosphere until a layer of oxide is formed on the unmasked surfaces 28 and 30. The sheets 26 and 27 are processed in an identical manner. The sheets 25, 26 and 27 which are placed one above the other as shown in FIG. 4*a*, are then heated and pressure is applied in the direction of the arrow causing the contacting oxidized surfaces to fuse together. This results in the laminate structure 35 shown in FIG. 4*b* which consists of alternate layers of oxide material 37 and magnetic material 38 having a total thickness of a few mils. The laminated structure 35 is then cut along the plane denoted by the section line 39 to form a strip 36 which is several mils wide. The laminated strip is then formed into the appropriate shape for use as the magnetic loop member 2 of the transducer shown in FIG. 2.

Figures 1, 2, 3, 4, 5, 6:
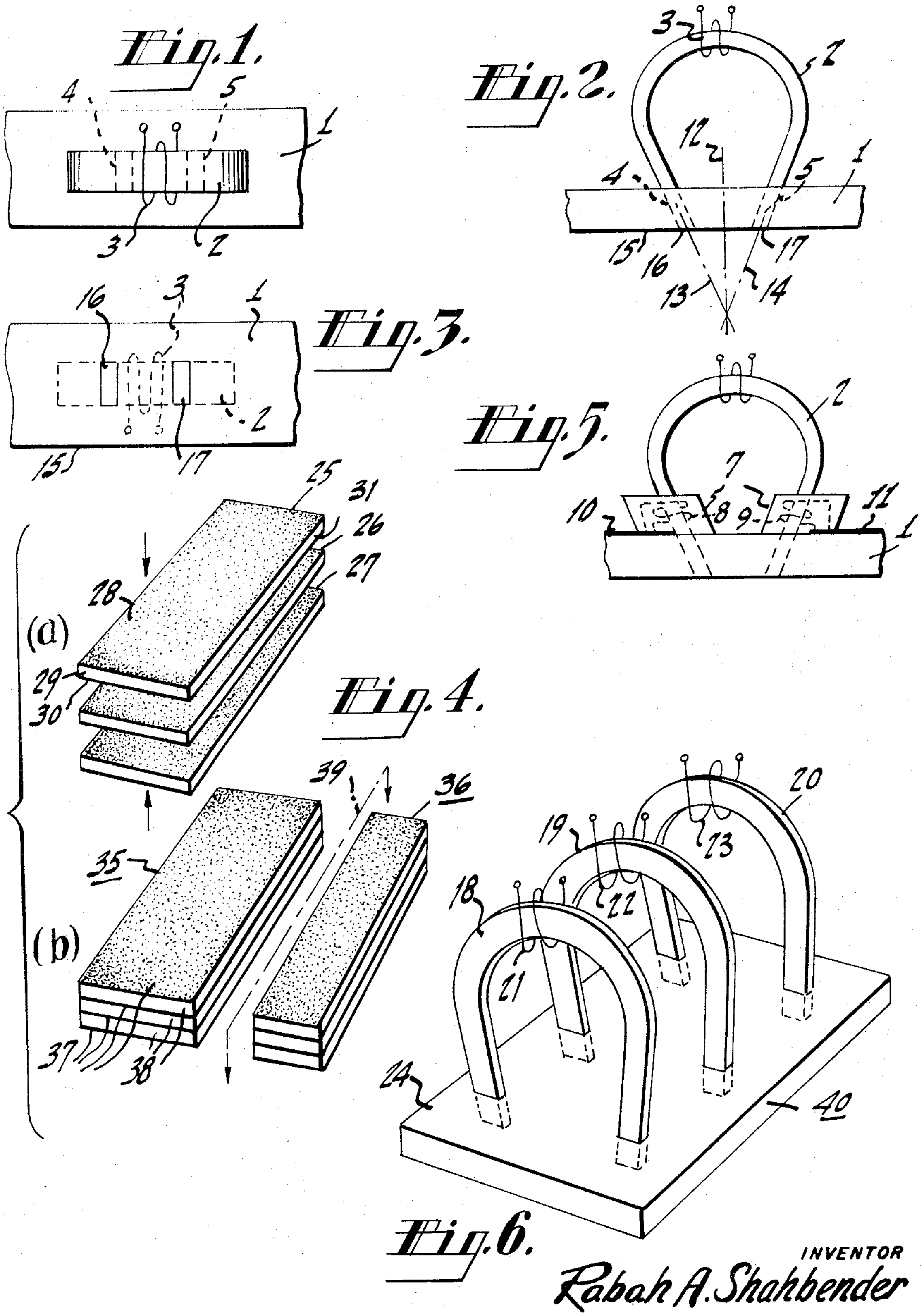
FIG. 1 is a top view of a magnetic transducer according to one embodiment of the invention.
FIG. 2 is a side view of the magnetic transducer of FIG. 1.
FIG. 3 is a bottom view of the magnetic transducer of FIG. 1.
FIG. 5 is a view of a magnetic transducer according to a second embodiment of the invention.
FIG. 6 is a perspective view of a multiple transducer assembly according to this invention.

If reference is made to FIG. 5, there is shown a magnetic transducer according to another embodiment of the invention. This transducer has a body member 1 and a magnetic loop 2 which are identical to the transducer of FIG. 2. Flux is excited in the loop 2 by means of electrical coils 8 and 9 which encircle portions of the loop 2 adjacent to the body member 1. The coils 8 and 9 are completely enclosed and thereby supported by a moldable material 7 such as known potting compounds which form an integral unit with the body member 1. The leads of the coils 8 and 9 are connected to printed circuit tabs which appear as edges 10 and 11 along the upper surface of the body member 1.

If reference is made to FIG. 6, there is shown the structure of a multiple head transducer assembly 40 according to the invention. The assembly 40 consists of a body member 24, which has the identical properties of the body member 1 of FIG. 2, a series of magnetic loops 18, 19 and 20 which have the identical properties of the loop 2 of FIG. 2, and corresponding electrical excitation coils 21, 22 and 23. The assembly 40 is manufactured according to the method disclosed for manufacturing the single transducer of FIG. 2 and operates in the same manner as the transducer of FIG. 2.

What is claimed is:

1. A method of manufacturing magnetic transducers consisting of a body of high reluctance material having at least one planar surface and a length of a magnetically permeable member comprising the steps of:
   a. drilling two apertures having a substantially constant rectangular cross section through said body and said planar surface at an angle inclined to the normal of said planar surface;
   b. forming said magnetically permeable member into the shape of a loop;
   c. passing each free end of said loop into and through one of said apertures starting from the end of the aperture which does not lie in said planar surface;
   d. machining the ends of said loop which protrude through said planar surface to make said loop ends flush with said planar surface; and
   e. lapping said planar surface including said loop ends, to form a smooth surface having a desired dimension along said surface between said loop ends.

2. The method according to claim 1 wherein:
   a. the drilling of said apertures in said body is performed with an electron beam drilling machine.

3. The invention according to claim 1, wherein said step of forming said magnetically permeable member into the shape of a loop, comprises the steps of; providing a plurality of thin sheets of magnetically permeable material, masking the edges of said sheets, heating said sheets in a proper oxidizing atmosphere to form a layer of oxide material on the unmasked surfaces, stacking said oxidized sheets to form a laminated structure, applying pressure to said laminating structure in the presence of sufficient heat to cause the contacting oxidized layers of said sheets to fuse together, cutting said fused sheets in a plane perpendicular to said oxidized layers to form a strip of said laminated material, and forming said strip into the shape of a loop having a desired distance between the free ends thereof.

* * * * *